(12) United States Patent
Morishita

(10) Patent No.: US 8,523,297 B2
(45) Date of Patent: Sep. 3, 2013

(54) BRAKE CONTROL SYSTEM FOR AN ELECTRICALLY DRIVEN VEHICLE

(75) Inventor: Shinichiro Morishita, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 219 days.

(21) Appl. No.: 13/226,903

(22) Filed: Sep. 7, 2011

(65) Prior Publication Data
US 2012/0139330 A1 Jun. 7, 2012

(30) Foreign Application Priority Data
Dec. 3, 2010 (JP) ................................. 2010-270185

(51) Int. Cl.
*B60T 8/64* (2006.01)
*B60T 8/17* (2006.01)

(52) U.S. Cl.
USPC .............................. 303/151; 303/155; 701/70

(58) Field of Classification Search
USPC ................... 303/10, 11, 114.1, 114.2, 114.3, 303/151, 152, 155; 701/70, 71, 78, 82, 83, 701/22
See application file for complete search history.

(56) References Cited

U.S. PATENT DOCUMENTS

| | | | |
|---|---|---|---|
| 6,813,553 B2 * | 11/2004 | Nakamura et al. | 701/70 |
| 8,255,106 B2 | 8/2012 | Vespasien | |
| 8,332,115 B2 * | 12/2012 | Kodama et al. | 701/70 |
| 2004/0054450 A1 | 3/2004 | Nakamura et al. | |
| 2005/0269875 A1 * | 12/2005 | Maki et al. | 303/152 |
| 2007/0228823 A1 * | 10/2007 | Kokubo et al. | 303/155 |
| 2008/0140274 A1 * | 6/2008 | Jeon et al. | 701/70 |
| 2009/0096280 A1 * | 4/2009 | Yamanao et al. | 303/11 |
| 2010/0222978 A1 | 9/2010 | Kodama et al. | |
| 2010/0299036 A1 | 11/2010 | Vespasien | |

FOREIGN PATENT DOCUMENTS

| | | |
|---|---|---|
| DE | 19917311 A1 | 10/1999 |
| FR | 2923422 A1 | 5/2009 |
| GB | 2336413 A | 10/1999 |
| JP | 2006-096218 | 4/2006 |
| JP | 2009107575 A | 5/2009 |

OTHER PUBLICATIONS

European Search Report dated May 22, 2013 from the corresponding European Patent Application No. 11007487.9-1756/2460701.

* cited by examiner

*Primary Examiner* — Thomas J Williams
(74) *Attorney, Agent, or Firm* — Young Basile

(57) ABSTRACT

During regenerative coordinate braking control, a target brake force is defined by eliminating influences of brake system component tolerances to achieve a comfortable brake feel and secure regenerative energy. A brake control system includes a master cylinder, wheel cylinders, a VDC brake fluid pressure unit and a motor controller. In response to a brake pedal operation by a driver, a brake pedal stroke position is detected at which a pressure in a master cylinder actually begins to be generated. A target deceleration characteristic is adjusted from a theoretical characteristic so that the target deceleration equals a maximum value of an add-on brake force (i.e., the regenerative brake gap) at the detected brake pedal stroke position.

13 Claims, 12 Drawing Sheets

BRAKE CONTROL SYSTEM FOR AN ELECTRICALLY DRIVEN VEHICLE

CROSS REFERENCE TO RELATED APPLICATION

This application claims priority to Japanese Patent Application No. 2010-270185, filed Dec. 3, 2010, which is incorporated herein in its entirety by reference.

TECHNICAL FIELD

The present invention generally relates to a brake control system applicable to electrically driven vehicles, such as hybrid, electric and fuel cell vehicles, that performs a generative coordinate brake control and achieves a target brake performance.

BACKGROUND

In Japanese Unexamined Patent Application No. 2006-096218, a conventional brake device for a vehicle is disclosed. A driver input amount is detected by a brake pedal stroke or master cylinder pressure, for example, and based on the detected driver input and a driver demand deceleration characteristic map, driver demand deceleration is calculated. To achieve this calculated demand deceleration, an add-on brake force will be generated to the vacuum booster output from a master cylinder (basic brake fluid pressure) and applied to a wheel by a feed-forward control.

In that device, the add-on brake force is defined as a part of deceleration amount to be added to the basic deceleration amount, which is attributable to a base brake fluid portion, so that the driver demand deceleration will be obtained. The add-on brake force may be obtained by either a regenerative braking and/or a pump up pressure portion. For example, the maximum value for the add-on brake portion may be set to correspond to a maximum regenerative amount, and an attempt will be made that the sum total of the base fluid pressure portion and a regenerative brake portion would meet the driver's brake demand as much as possible. In the event that the sum is not enough to meet the driver's demand, then the shortage of deceleration amount will be compensated for by a pump up of the master cylinder pressure attained by a conventional vehicle dynamics control (VDC) brake pressure unit, which is interposed between the master cylinder and wheel cylinders and generates a higher wheel cylinder pressure than the master cylinder pressure by way of a pump-up pressure increase.

BRIEF SUMMARY

In the brake control device described above, a driver demand deceleration characteristic map is prepared and a driver deceleration performance in response to driver's input amount on the brake pedal is defined based on a predetermined, nominal point of brake pedal stroke at which a master cylinder pressure is supposed to generate. Due to this arrangement, the actual point of the brake pedal stroke may differ from that designed value due to mechanical tolerances of brake related components, which can ultimately lead to an unpleasant brake feel.

For example, when the actual generation point is delayed as compared to the designed point, then a situation occurs in which a driver demand deceleration would not increase despite a need for an increased amount of deceleration in response to a progressive stroke of the brake pedal. Conversely, if the actual master cylinder pressure generation point is earlier than designed, the driver demand deceleration will be kept low as the target deceleration and a regenerative recovery of energy is restricted, causing a deterioration in fuel or electrical efficiency.

In contrast, embodiments of the present invention set a target brake force by eliminating variations in the master cylinder pressure generation points due to mechanical tolerances of the brake components. A comfortable brake feel will thus be achieved while maintaining secure recovery of regenerative energy during regenerative coordinate brake control.

One embodiment of an electrically driven vehicle described herein is provided with a master cylinder, a wheel cylinder, a brake fluid pressure actuator, a regenerative brake force control unit, a regenerative coordinate brake control unit and a brake target characteristic map setting unit. The master cylinder generates a master cylinder pressure (MC pressure) in response to a driver's operation of the brake pedal. The wheel cylinders are each provided at the associated front or rear wheels and apply hydraulic braking pressure responsive to a wheel cylinder pressure. The brake fluid pressure actuator is interposed between the master cylinder and wheel cylinders and contains a fluid pressure pump driven by a pump motor and differential pressure valves that, during a driving state of the pump motor, control a pressure difference between the wheel cylinder pressure and master cylinder pressure. The regenerative brake force control unit is coupled to an electric motor/generator connected to driving wheels for vehicle propulsion, and, during braking operation, the regenerative brake force control unit controls the amount of regenerative braking produced by the electric motor acting as a generator. The regenerative coordinate brake control unit, in response to a brake operation, achieves the target brake amount required by a sum total of the base brake fluid pressure from the master cylinder and at least one of the regenerative force by the motor or the add-on brake portion by the brake fluid pressure actuator for increasing the MC pressure. Finally, the brake target characteristic setting unit detects a brake pedal stroke or position at which a MC pressure actually generates (as opposed to a theoretical position) and sets the add-on brake portion to be a maximum corresponding to a regenerative gap.

Therefore, a brake target characteristic is prepared in such a way that, at the actual detected master cylinder pressure generating point, a maximum brake value (between a permissible upper and lower value) to be added to the base brake fluid portion is an appropriate value. Due to the mechanical tolerances of brake system components, such as those caused by manufacturing or assembly tolerances or wear, the actual master cylinder pressure generating points may vary and be delayed or advanced as compared to that originally designed on a theoretical basis. However, in whichever direction they vary, a maximum add-on brake characteristic value is set to be the maximum value with a tolerable range at the actual MC pressure generating points, and based on this setting a variable target brake characteristic is determined. Therefore, even if the actual master cylinder pressure generating point should be delayed from the designed generating point, no suppression of increase of brake target force is experienced up to the MC pressure generating point with the advance of brake pedal stroke. Thus a comfortable brake feel is achieved. Conversely, even if the actual master cylinder pressure generating point advances with respect to the originally designed generating point, a suppression of increase in brake target force is avoided. In addition, recovery of regenerative energy for fuel and electricity savings is secured.

As a result, when the vehicle is under regenerative braking conditions, an appropriate brake target force may be set by compensating for the variations in MC pressure generating points due to mechanical tolerances or wear, and both a comfortable brake feel and a secure recovery of regenerative braking energy are assured.

BRIEF DESCRIPTION OF THE DRAWINGS

The description herein makes reference to the accompanying drawings wherein like reference numerals refer to like parts throughout the several views, and wherein:

FIGS. 13A, 13B and 13C are graphs of target deceleration characteristics wherein FIG. 13A shows a reference target deceleration characteristic, FIG. 13B shows a first target deceleration characteristic obtained by an offset of the reference target deceleration characteristic where the actual stroke is greater than designed, and FIG. 13C shows a second target deceleration characteristic obtained by an offset where the actual stroke is smaller than designed;

DETAILED DESCRIPTION OF EMBODIMENTS OF THE INVENTION

The following is an explanation of certain embodiments of a brake control system for an electrically driven vehicle with reference to the drawings.

Figure 1:
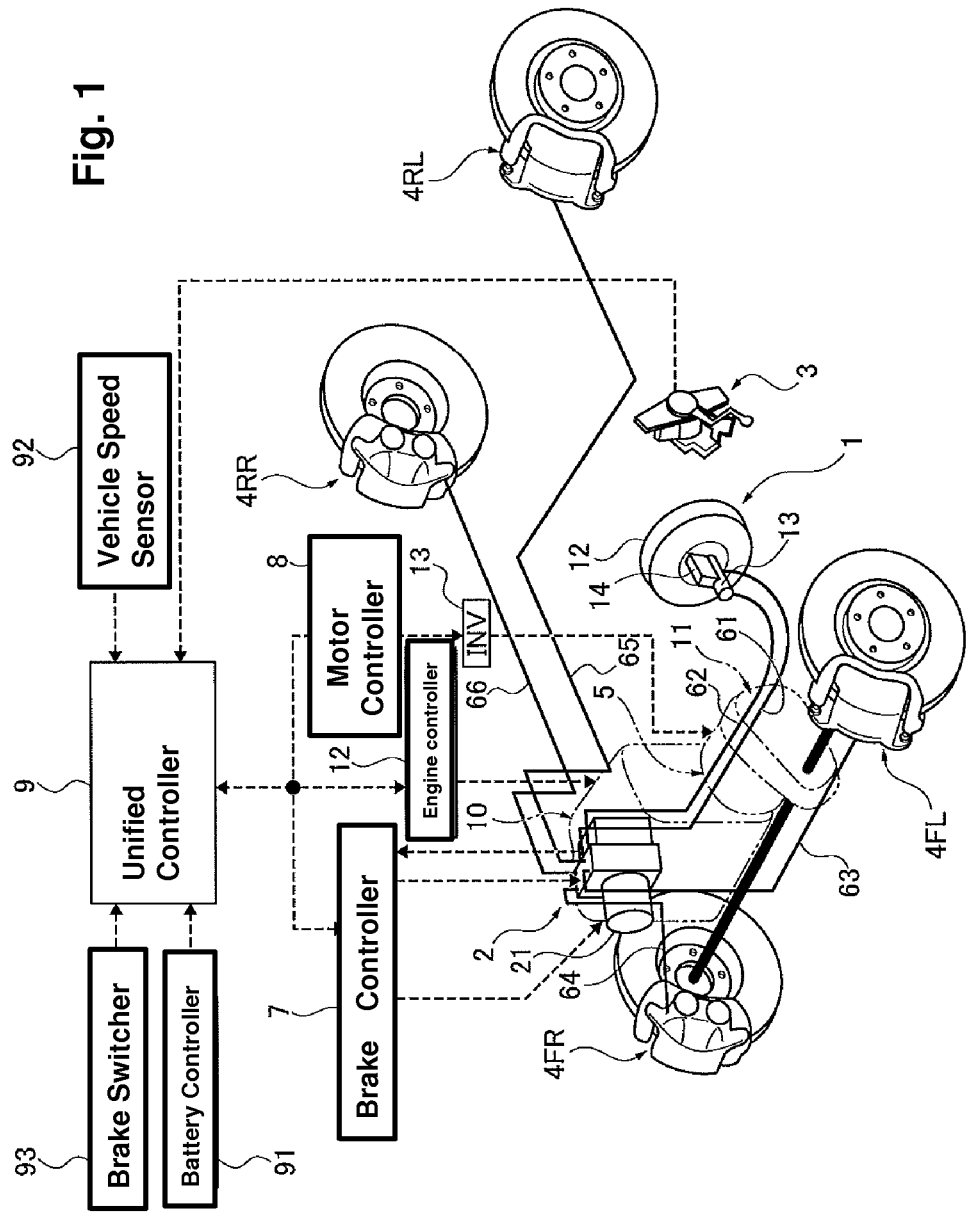
FIG. 1 is a schematic view showing a brake system of a hybrid electric vehicle (HEV) of the front wheel drive to which a brake control system according to embodiments of the invention can be applied.
Figure 2:
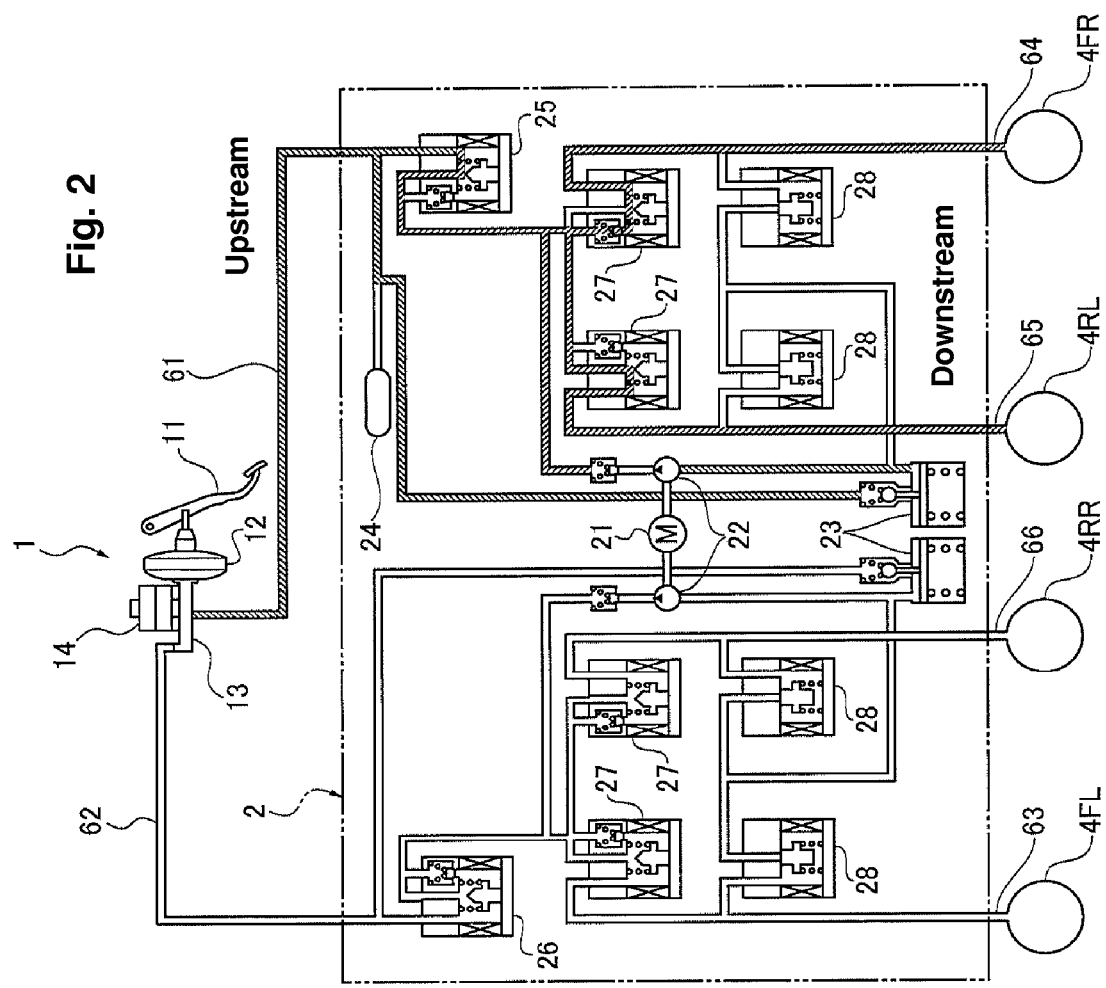
FIG. 2 is a detailed schematic view showing a brake fluid pressure circuit including a VDC brake hydraulic pressure unit in the brake system according to a first embodiment of the invention.

FIG. 1 shows a system configuration of a hybrid electric vehicle (HEV) of a front wheel drive type to which a brake control system according to embodiments of the present invention can be applied. FIG. 2 illustrates a VDC brake system as an example of brake fluid pressure actuator. Below is an explanation of regenerative coordinate brake system with references to these drawings.

A brake deceleration generating mechanism of the brake control system according to this example includes a brake fluid pressure generating unit 1, a VDC brake fluid unit 2 (also called a brake fluid pressure actuator), a stroke sensor 3 for detecting a brake pedal stroke, wheel cylinders, specifically a left front wheel cylinder (4FL), a right front wheel cylinder (4FR), a left rear wheel cylinder (RL), and a right rear wheel cylinder (4RR), and an electric motor 5 for vehicle propulsion.

A vehicle dynamics control (VDC) system is incorporated for a regenerative coordinate brake system. The VDC system generally copes with the disruption of vehicle behaviors such as entering a corner at high speed and/or quick manipulation of the steering wheel, avoids lateral slipping and provides a good running stability. For example, if the VDC control is implemented to a vehicle running in a corner where an oversteer tendency detected, a wheel at the front and corner outer side will be braked. When cornering behavior indicates an understeer tendency, vehicle propulsion power will be reduced and a wheel at the rear and inner side of the corner will be braked.

Brake fluid pressure generating unit 1 generates a base brake fluid pressure in accordance with the driver's operation of a brake pedal. As shown in FIGS. 1 and 2, the brake fluid pressure generating unit 1 includes a brake pedal 11, a vacuum booster 12, a master cylinder 13 and a reservoir tank 14. A brake pressure generated by the driver applying brake pedal 11 is amplified by vacuum booster 12, and a primary fluid pressure and a secondary fluid pressure will be generated by master cylinder 13. Here it should be appreciated that brake deceleration generated by master cylinder 13 should be set to be smaller than the target deceleration, i.e., a driver demand deceleration amount.

VDC brake fluid pressure unit 2 is interposed between brake fluid pressure generating unit 1 and wheel cylinders 4FL, 4FR, 4RL and 4RR associated with respective wheels. VDC brake fluid pressure unit 2 is a brake fluid pressure actuator and has fluid pressure pumps 22 driven by a VDC motor 21, which is a dedicated electric motor. VDC brake fluid pressure unit 2 increases, maintains or reduces a pressure from master cylinder 13. Moreover, VDC brake fluid pressure unit 2 and brake fluid pressure generating unit 1 are connected to each other via primary fluid conduit 61 and secondary fluid conduit 62. VDC brake fluid pressure unit 2 is connected to each wheel cylinder 4FL, 4FR, 4RL and 4RR through a left front wheel fluid conduit 63, a right front fluid conduit 64, a left rear wheel fluid conduit 65 and a right rear wheel fluid conduit 66, respectively. This way, when the driver applies brake pedal 11, a master cylinder pressure generated at brake fluid pressure generating unit 1 will further be raised by VDC fluid unit 2 and introduced into respective wheel cylinders 4FL, 4FR, 4RL, 4RR to exert a braking operation.

VDC brake fluid generation unit 2 is detailed in FIG. 2 and has fluid pressure pumps 22 driven by VDC motor 21, reservoirs 23 and a master cylinder pressure sensor 24 for detecting an actual master cylinder pressure. Various solenoid valves are employed including a first master cylinder (M/C) cutoff solenoid valve 25 (e.g., a differential pressure valve), a second M/C cutoff solenoid valve 26 (e.g., a differential pressure valve), pressure holding solenoid valves 27 and pressure reduction solenoid valves 28. Both first M/C cut solenoid valve 25 and secondary M/C cutoff solenoid valve 26 control, under operation of VDC motor 21, a pressure difference developed between a wheel cylinder pressure and a master cylinder pressure. The wheel cylinder pressure corresponds to a downstream pressure, and the master cylinder pressure correspondence to an upstream pressure.

Brake pedal stroke sensor 3 is provided to detect an operation amount or stroke by a driver utilizing a potentiometer, for example. This stroke sensor 3 is intended to detect a target deceleration amount, i.e., a driver demand deceleration level, for use in regenerative coordinated brake control.

Respective wheel cylinders 4FL, 4FR, 4RL, 4RR are each provided at an associated brake disk for front or rear wheels, and each is supplied with a controlled hydraulic pressure. When the fluid pressure is applied to each wheel cylinder 4FL, 4FR, 4RL and 4RR, brake rotors or disks are clamped by brake pads to apply a friction force therebetween, which in turn results in a hydraulic braking force to wheels.

Electric motor 5 is provided as a driving source for driving wheels (left and right front wheels 4FL, 4FR in this example) and functions as both a driving motor and a generator. Electric motor 5 transfers a driving force or torque to the driving wheels when driven by energy from the battery. Moreover, in a regenerative mode, the motor applies load to left and right front wheels and thus recovers kinetic energy through regenerative braking to feed the battery. In addition, the driveline of the driving wheels can be further coupled to an internal combustion engine as another driving source with a transmission interposed in a HEV.

As shown in FIG. 1, the brake deceleration control system according to certain embodiments includes a brake controller 7, a motor controller 8 (also called a regenerative brake controller), a unified controller 9 and an engine controller 12. These controllers are connected with each other through a controller area network (CAN) or other on-vehicle local area network (LAN), and hence can mutually give and receive information. Unified controller 9 and the other controllers described herein generally consist of a respective microcomputer including central processing unit (CPU), input and output ports (I/O) receiving certain data described herein, random access memory (RAM), keep alive memory (KAM), a common data bus and read only memory (ROM) as an electronic storage medium for executable programs and certain stored values as discussed herein. The functional (or processing) units of the unified controller 9 and the other functions (i.e., control logic) of the controllers 7, 8 and 12 could be, for example, implemented in software as the executable programs, or could be implemented in whole or in part by separate hardware in the form of one or more integrated circuits (IC). Controllers 7, 8, 9, 12 can each be an engine control unit (ECU) as known in the art programmed as described herein.

Further, although multiple controllers 7, 8, 9, 12 are shown, the functions of each can be included or programmed into fewer or more controllers.

Brake controller 7 receives a command signal from unified controller 9 and pressure indicative information from master cylinder pressure sensor 24 of VDC brake fluid pressure unit 2. Then, based on predetermined control logic, brake controller 7 outputs drive command signals to both VDC motor 21 of VDC brake fluid pressure unit 2 and the plurality of solenoid valves 25, 26, 27 and 28. During regenerative braking control operations, brake controller 7 adjusts a pressure difference between the wheel cylinder pressure and the master cylinder pressure in response to receipt of a pump-up pressure command from unified controller 9. This pressure differentiating control is performed by operation current applied to both first M/C cutoff solenoid valve 25 and second M/C cutoff solenoid valve 26 on the one hand, and by a pump-up pressure increase by VDC motor 21 on the other. Here, it should be appreciated that brake controller 7 performs other control, such as VDC control, traction control system (TCS) control and anti-lock braking system (ABS) control, in addition to regenerative braking control.

Motor controller 8 is connected via an inverter (INV) 13 to electric motor 5 for vehicle propulsion. During a regenerative braking operation, the regenerative power generated by electric motor 5 will be controlled by motor controller 8 based on a regenerative braking portion command from unified controller 9. Motor controller 8 also functions to control, during vehicle travelling, a motor torque or revolution speed of electric motor 5 depending on running conditions and vehicle conditions.

Unified controller 9 performs regenerative coordinate brake control and attains a target deceleration during brake application by summing a master cylinder pressure-based braking (also called a base brake fluid pressure portion) and an add-on braking portion. The add-on braking portion is at least one of a regenerative braking portion supplied by brake controller 7 and a pump-up pressure portion supplied by VCD brake pressure unit 2. The target deceleration is determined based on a detected brake pedal stroke or position from stroke sensor 3 and a previously defined target deceleration characteristic map. To this unified controller 9, various input signals are input including battery state-of-charge information from battery controller 91, vehicle speed related information from a vehicle speed sensor 92, the brake actuation stroke signal from stroke sensor 3 and master cylinder pressure information from master cylinder pressure sensor 24. The vehicle speed sensor 92 may preferably be a wheel rotational speed sensor to detect the vehicle speed down to a significantly low vehicle speed.

Figure 3:
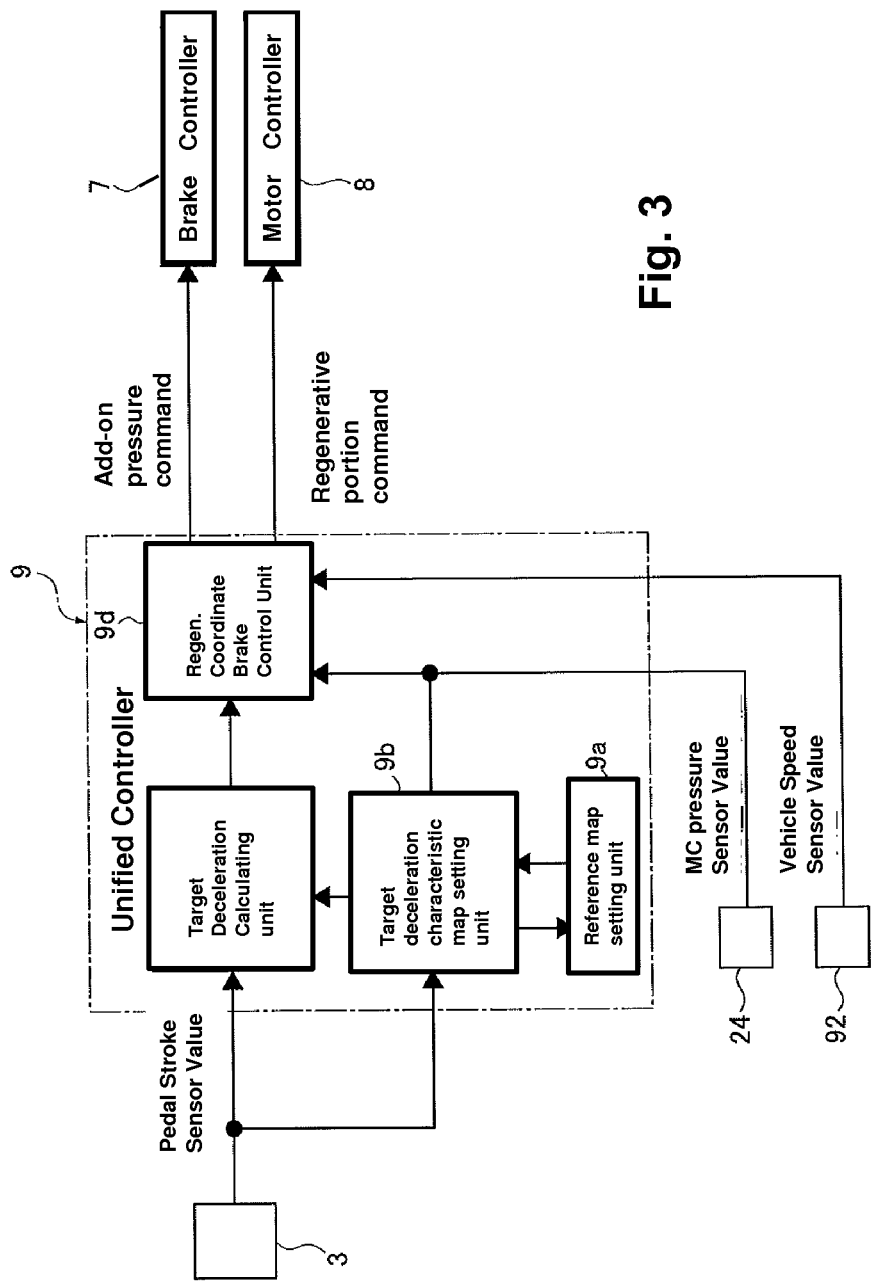
FIG. 3 is a control block diagram showing a regenerative coordinate brake system according to the first embodiment.

Referring to FIG. 3 showing a control block diagram of a regenerative coordinate brake system in the brake control system according to an embodiment of the present invention, an outline of the basic components of the regenerative coordinate brake system is now described. As shown, the regenerative coordinate brake control system has brake controller 7, motor controller 8 and unified controller 9. Unified controller 9 includes a reference map setting unit 9a (also called a reference brake target characteristic map setting unit), a target deceleration characteristic map setting unit 9b (also called a braking target characteristic map setting unit), a target deceleration calculating unit 9c and a regenerative coordinate brake control unit 9d.

Reference map setting unit 9a determines a designed master cylinder pressure generating point of the brake pedal stroke position based on a previously estimated loss stroke of brake pedal 11. Based on this designed stroke, a reference target deceleration characteristic map as compared to a pedal stroke position is previously set and stored. This map is also called a reference target brake characteristic map.

Target deceleration characteristic map setting unit 9b receives signals indicative of the brake pedal stroke position and the master cylinder pressure and, based on these signals, detects an actual master cylinder pressure generating point at a given brake pedal stroke position with an offset stroke distance representing a difference of the given brake pedal stroke position from the referenced or designed brake pedal position. Then, the reference deceleration characteristic is read from reference map setting unit 9a and shifted by the offset stroke distance in such a way that an add-on value for brake deceleration will be maximized and becomes the regenerative gap at the actual master cylinder pressure generating point of brake pedal 11.

Target deceleration calculating unit 9c calculates a target deceleration, also called a driver demand total amount of deceleration or brake target force, based on the target deceleration characteristic from the target deceleration characteristic map set at target deceleration characteristic map setting unit 9b and the brake pedal stroke position detected by stroke sensor 3.

Regenerative coordinate brake control unit 9d receives the target deceleration calculated at target deceleration calculating unit 9c, the master cylinder pressure from master cylinder pressure sensor 24, and the vehicle speed from vehicle speed sensor 92. It then determines a base brake fluid pressure portion based on the master cylinder pressure and a regenerative braking portion based on the vehicle speed and tries to achieve the target total braking deceleration using the base brake fluid pressure portion and regenerative braking portion so as to obtain a high recuperation rate of braking energy. In the event, however, that a shortage would occur and these two portions would not satisfy the target braking demand, then the shortage will be supplemented by a pump-up pressure portion. Based on these calculations, unified controller 9 sends a command signal for the regenerative portion to motor controller 8 and a command signal indicative of the pump-up pressure portion to brake controller 7.

Figure 4:
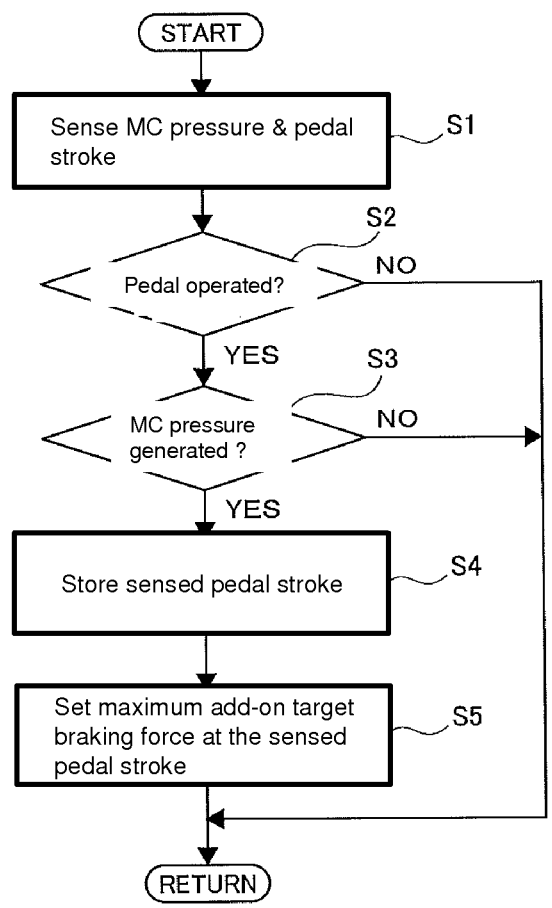
FIG. 4 is a flow chart for setting a target deceleration characteristic map within a target deceleration characteristic map setting unit of a unified controller of FIG. 3.

Referring now to FIG. 4, a flow chart of control for setting a target deceleration characteristic map that is prepared by target deceleration characteristic map setting unit 9b is shown. Respective control steps involved in preparation of the target brake characteristic map are next described. This control routine may be initiated off-line after the brake control components have been assembled at a factory or dealership. Alternatively, the routine may be initiated each time the engine is started by an ignition switch and/or vehicle start button for a HEV, fuel cell or electric vehicle and a brake pedal is subsequently operated by a driver.

At step S1, master cylinder pressure information from master cylinder pressure sensor 24 and brake pedal stroke information from brake stroke sensor 3 are read, and control proceeds to step S2.

At step S2, based on a switch signal from brake switch 93 it is decided whether or not the driver applies brake pedal 11. If so (brake pedal 11 is applied), the control goes to step S3, and if not (brake pedal 11 is being not applied), then control returns.

At step S3, subsequent to an affirmative decision at step S2, a decision is made as to whether a master cylinder pressure is generated in response to the brake pedal operation. If a master cylinder pressure is actually generated, the control proceeds to step S4. If a master cylinder pressure is not yet detected, the control returns.

At step S4, subsequent to the decision in step S3 that the master cylinder generates an actual pressure, the point or position of the brake pedal stroke at which the actual master cylinder pressure is generated is stored as an actual master cylinder pressure generating point in memory of unified controller 9, and control proceeds to step S5.

At step S5, a target value for the add-on brake portion for braking deceleration is maximized at the stored pedal stroke position representing the actual master cylinder pressure generating point, and a gradual, preferably non-linear, target deceleration characteristic profile or curve is stored as a target deceleration characteristic map. Then, control returns. In the preparation of this target deceleration characteristic map, a brake depressing velocity may preferably be incorporated. The brake pedal depressing velocity is generally calculated by the difference in brake pedal positions detected at each control cycle.

Figure 5:
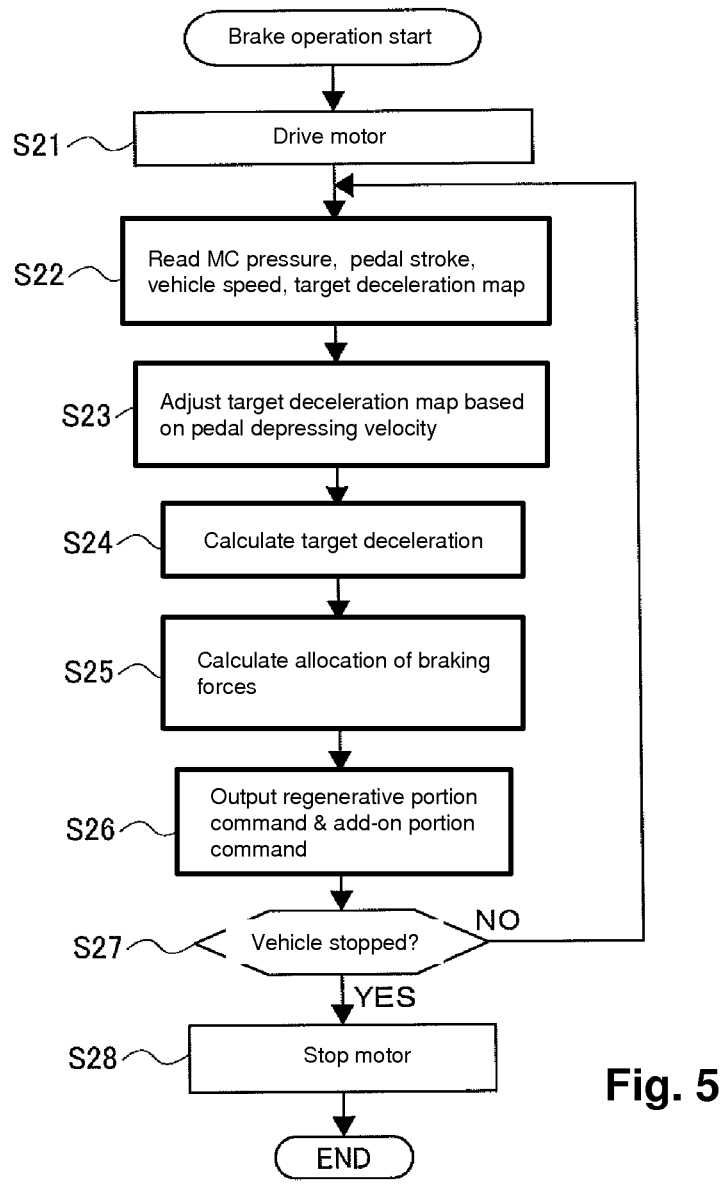
FIG. 5 is a flow chart showing regenerative coordinate brake control processes being performed by both a target deceleration calculation unit and a regenerative coordinate brake control unit of the unified controller of FIG. 3.

Referring to FIG. 5, a flow chart showing a regenerative coordinate brake control process performed by both target deceleration calculation unit 9c and regenerative coordinate brake control unit 9d is now described. The regenerative coordinate brake control process starts upon brake pedal 11 being operated by a vehicle driver.

At step S21, VDC motor 21 is set to a driven state from a stopped state it is in before the brake pedal operation, and control goes to step S22.

At next step S22, a master cylinder pressure from master cylinder sensor 24, a pedal stroke from stroke sensor 3, a vehicle speed from vehicle speed sensor 92 and the target deceleration characteristic map set at step S5 of FIG. 4 are read, and control proceeds to step S23.

At step S23, a brake pedal depressing velocity is calculated and the target deceleration characteristic is adjusted depending on the brake pedal depressing velocity. It is appreciated here that adjustment of the target deceleration characteristic will be made when the previously estimated or designed brake depressing velocity for a previously set target deceleration characteristic becomes different from that calculated. More specifically, when the calculated brake pedal depressing velocity is faster than that previously designed, calculated or estimated, an offsetting of the target deceleration characteristic will be made such that the loss stroke to the actual master cylinder pressure generating point will be set smaller. When the calculated pedal depressing velocity lies within a permissible tolerance range of a previous value, there is no need for adjustment of the target deceleration characteristic.

At step S24, subsequent to the optional adjustment of the target deceleration characteristic based on brake pedal depressing velocity in step S23, a final target deceleration characteristic is prepared over various brake pedal stroke positions. Control then proceeds to step S25.

At step S25, a base brake fluid pressure portion is detected based on the master cylinder pressure read in step S22. Then, a maximum regenerative amount available is determined based on the vehicle speed and the state of charge of the battery and is designated as a regenerative braking portion. After subtracting the base brake fluid pressure portion and the regenerative braking portion from the total target for deceleration amount, the remainder is desirably allocated to the pump-up pressure portion. In other words, the sum total of a basic brake pressure portion, a regenerative brake portion and a pump-up pressure portion meet the driver's intent for the desired amount of deceleration indicated by input to brake pedal 11. The regenerative coordinate brake control then goes to step S26.

At step S26, allocation of the target add-on brake force, i.e., the amount of deceleration not covered by the base brake fluid pressure portion, is made. Specifically, a command signal indicative of the regenerative brake portion (even if no demand is requested) is sent to motor controller 8. At the same time, a command signal indicative of the pump-up pressure portion (even if no demand is requested) is sent to brake controller 7. Then, control proceeds to step S27. Here, motor controller 8 determines upon receipt of the regenerative command a regenerative portion as the target regenerative brake force and performs regenerative torque control by feed-forward controlling electric motor 8 to determine regenerative current. Brake controller 7 determines, upon receipt of the pump-up pressure command, a pump-up pressure portion as a target pressure difference, and, referring to the relationship between target pressure difference and operative current as shown by example in FIG. 6, feed-forward controls M/C cutoff solenoid valves 25, 26 by applying the necessary operating current to obtain the required pressure difference.

At step S27, subsequent to output of the regenerative brake command and the pump-up pressure command at step S26, it is determined whether or not the vehicle comes to stop based on vehicle speed from vehicle speed sensor 92. If the vehicle is stopped, then control proceeds to step S28. In contrast, if the vehicle is still in motion, then control returns to step S22.

If the vehicle is stopped at step S27, operation of VDC motor 21 stopped at step S28, and the process comes to end.

In the following, a technical problem underlying conventional regenerative coordinate braking system is explained. Then, operations of the brake control system for a HEV according to the first embodiment are explained in three sections: 1) controlled operations of regenerative coordinate braking, 2) setting of a target deceleration characteristic map and 3) adjustment of the target deceleration characteristic map.

Technical Problem Underlying Conventional Regenerative Coordinate Braking

Figure 7:
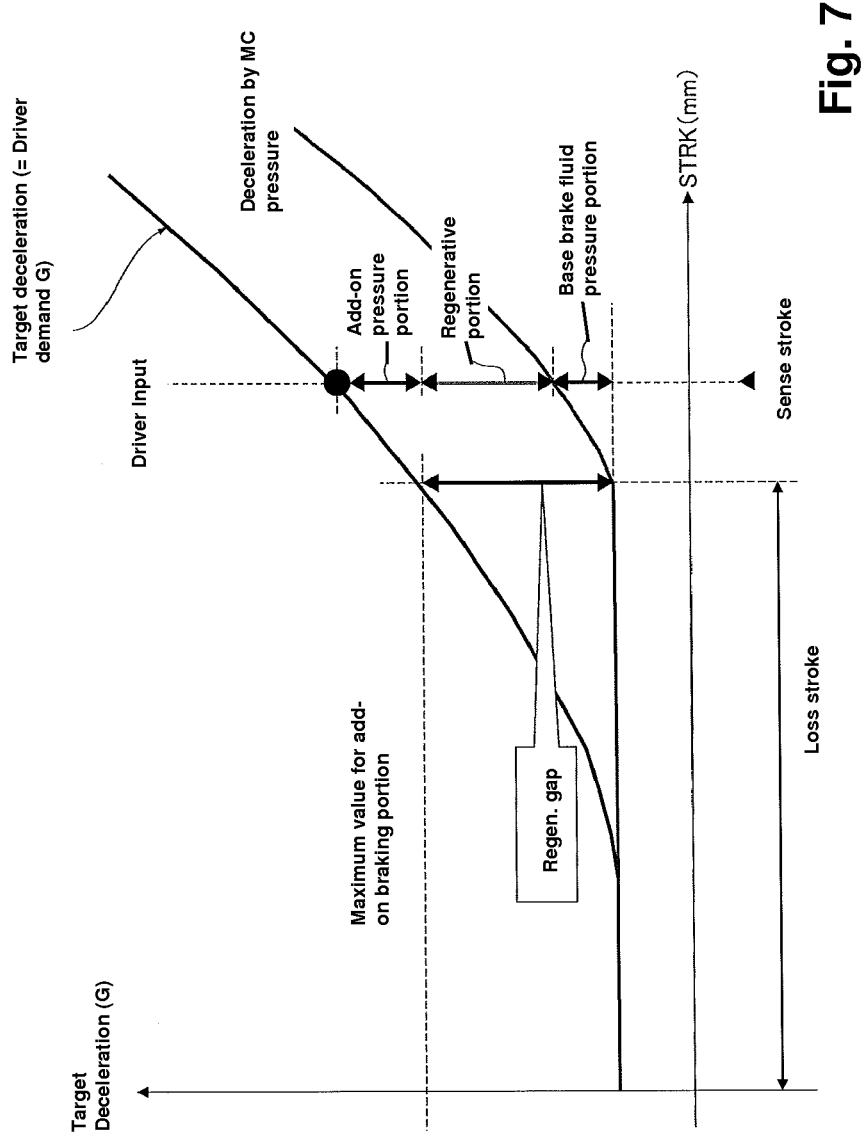
FIG. 7 is a graph of a control concept in accordance with a regenerative coordinate brake control system using a VDC, in which a target deceleration will be obtained by a sum total of a base brake hydraulic pressure, a regenerative brake portion and a pump-up pressure portion.

Regenerative coordinate braking control using a VDC is directed to supplementing the brake fluid pressure needed to meet a driver's demand for the necessary deceleration that cannot be met by a base brake pressure portion and a regenerative brake portion alone. The supplemental brake fluid pressure is obtained by using a VDC brake pressure unit. The overall operation of this regenerative coordinate brake system using the VDC is now explained with reference to FIG. 7.

First, when a brake is actuated, a base brake fluid pressure generated thereby and amplified by a vacuum booster is designed to equal the driver demand target deceleration. In contrast, in regenerative coordinate braking, the system intentionally reduces the available brake fluid pressure to produce a shortage to the desired deceleration, resulting in a so-called regenerative gap between the base brake fluid pressure and the required total brake force. Attempt has been made so that this regenerative gap is maximized where efficiency is a priority.

However, depending on the vehicle speed and state of charge of the battery, for example, the amount of deceleration not coverable by the base brake fluid pressure is also not sufficiently covered by the regenerative operation. To cope with this situation, in a regenerative coordinate brake system including the VDC brake pressure unit, the total amount of braking deceleration is basically designed to be supplied by the sum of the base brake fluid pressure portion from the vacuum booster and the regenerative portion from the regenerative brake. Only when these two would not be enough to meet the total demand would the shortage be covered by the VDC brake fluid unit (as a pump-up pressure portion). This is shown in FIG. 9.

In contrast to the conventional VDC, characteristic property changes of both the vacuum booster and VDC fluid pressure unit and installation of brake pedal stroke sensor are sufficient to provide an economical regenerative coordinate brake system utilizing the VDC. In other words, the safety of the conventional VDC may be expanded with the teachings herein while having a regenerative coordinate brake function.

Figure 8:
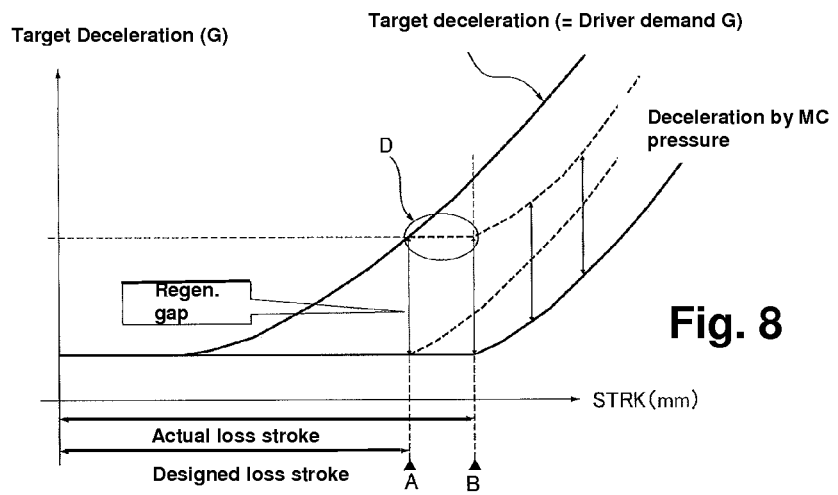
FIG. 8 is a graph showing a regenerative coordinate brake operation of a comparative example of a HEV with the associated technical problem being illustrated when the actual master cylinder loss stroke is greater than designed.
Figure 9:
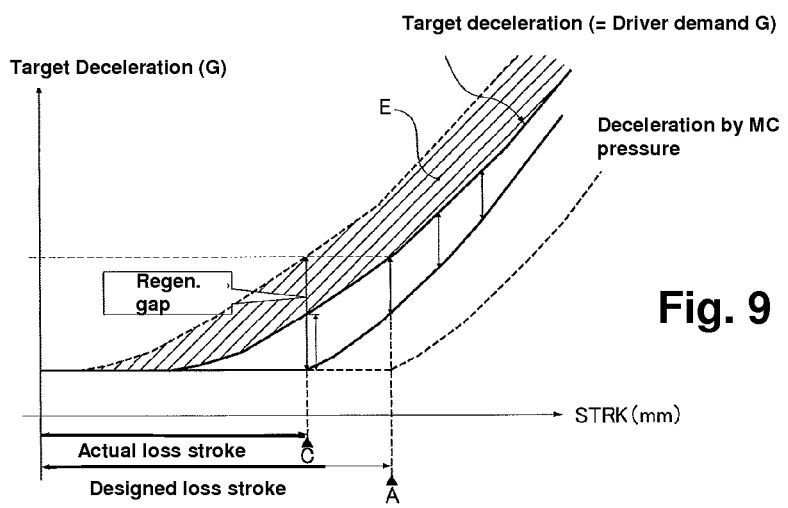
FIG. 9 is a view showing a regenerative coordinate brake operation for a comparative example of a HEV with the associated technical problem being illustrated when the actual master cylinder loss stroke is smaller than designed.

As shown in solid lines in FIGS. 8 and 9, a hypothetical comparative example is illustrated where the target deceleration is set to match the amount of the regenerative gap at a designed master cylinder pressure generating point with loss stroke position B, and a target deceleration characteristic curve is defined to change gradually with respect to a change in the brake pedal stroke.

It should be appreciated here that the stroke position reaching the designed loss stroke value corresponds to the designed master cylinder pressure generating point at which a master cylinder pressure is designed to start to generate in the nominal designed model. Also, the expression "regenerative gap" denotes a difference between the target deceleration and the base brake fluid pressure portion caused by the M/C pressure. This difference is fulfilled by the maximum amount of pressure available from the regenerative brake, and thus is named the regenerative gap.

In the comparative example, when installed on a vehicle and an actual master cylinder pressure generating point corresponding to an actual loss stroke changes, discomfort due to the target deceleration characteristic could be experienced as detailed below.

FIG. 8 is used to describe the situation in which the actual master cylinder pressure generating point B (hereinafter referred to "point B") is delayed as compared to the designed master cylinder fluid pressure generating point A (hereinafter simply "point A").

At point A, the deceleration characteristic (Target G) is targeted such that the basic brake fluid pressure portion (where the amount is zero) is added to the regenerative gap, and thus the target deceleration will be obtained by the regenerative gap. In contrast, the characteristic value at point B of the brake pedal stroke, reached later than point A, is obtained when the value at point A is combined with an increased amount of base brake fluid pressure amount to be expected. However, even at point B, due to the delay in the master cylinder pressure generating point, the base fluid pressure portion remains zero. Therefore, a target deceleration is obtained by the regenerative gap only. Put another way, the target deceleration characteristic as the brake pedal stroke advances will be constant from point A to B as shown by the encircled area designated D. Accordingly, the target deceleration will not rise despite the indication by the driver of the need to increase the target deceleration as the brake pedal stroke advances.

Therefore, when actual master cylinder pressure generating point B is delayed from the designed point A, the target deceleration will not be achieved properly due to the delay of the base brake fluid pressure generation. In addition, when the brake pedal stroke reciprocates over the region including point A and B, the vehicle deceleration is held constant and the vehicle deceleration in response to brake application becomes constant. Thus, a discontinuous or uneven brake deceleration is experienced, and pedal feel deteriorates.

FIG. 9 demonstrates a situation in which the actual master cylinder generation point C (hereinafter point C) advances earlier than the designed master cylinder pressure generating point A.

The characteristic value (Target G) at point C of brake pedal travel is determined by adding a value less than the regenerative gap to the base fluid pressure portion, which assumes a value of zero. Thus the resulting deceleration level obtained is less than the regenerative gap. By comparison, at point A, the deceleration characteristic increases gradually and becomes the total sum of the basic brake fluid pressure portion plus the regenerative gap so that the target deceleration level corresponds to the regenerative gap. However, since the base brake fluid pressure portion has already increased to some extent at point A, the regenerative brake portion is set smaller than the regenerative gap. Therefore, the target deceleration characteristic increases in response to an earlier generation of the base brake fluid pressure, with the add-on brake portion maintained at a value less than the regenerative gap. In other words, since the add-on brake portion will be maintained at low level, the hatching portion illustrated by region E in FIG. 9 is regarded as a regenerative braking restriction region. Therefore, although the target deceleration characteristic is obtained with a gradual change over pedal stroke, the regenerative torque is restricted over the entire brake stroke travel. As a result, the fuel consumption efficiency deteriorates for a HEV, and electrical economy goes down for an electric vehicle.

1) Controlled Operations of Regenerative Coordinate Braking

For a HEV, unlike an internal combustion engine (ICE) vehicle in which all the braking energy will be dissipated as heat when the vehicle is slowing down, the kinetic energy due to braking is recovered and stored in the battery, which is a key to the efficiency advantage of hybrid vehicles. This is known as regenerative braking, and the description therefore is now made.

Referring back to FIG. 5, when brake pedal 11 is applied, control begins at step S21, and then proceeds through step S22 to step S27. At step S27, as long as the vehicle remains at stand-still condition, control proceeds to step S28, and the program of regenerative coordinate braking control ends.

More specifically, based on the brake pedal stroke position sensed and the target deceleration characteristic map as defined or adjusted, the target deceleration corresponding to the brake pedal stroke by driver actuation is calculated at step S24. At step S25, a base brake fluid pressure portion is determined based on the sensed master cylinder pressure together with a possibly recoverable maximum regenerative energy portion based on the vehicle speed and state of charge of the battery. Subsequently, the remaining deceleration portion obtainable by subtracting the base brake fluid pressure portion and the regenerative brake portion from the target deceleration is assigned to the pump-up pressure portion, which is realized by brake controller 7. At step S26, the regenerative brake corresponding portion is sent as a regenerative portion command (even if a zero command) to motor controller 8, while the pump-up pressure portion is sent as a pump-up command (even if a zero add-on command) to brake controller 7.

Figure 6:
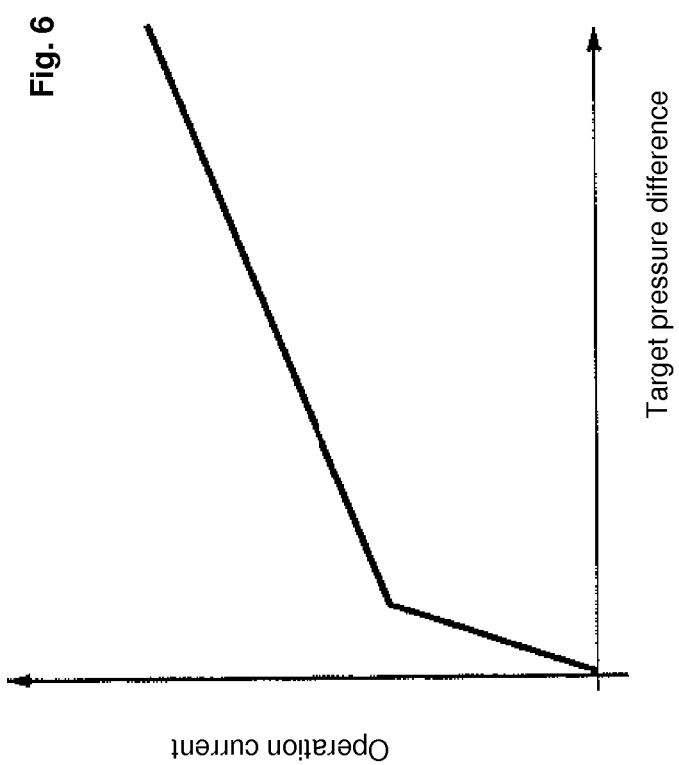
FIG. 6 is a graph of a relationship between an operation current value applied to a differential pressure valve and a target difference pressure that is used for determination of a command value to obtain the add-on brake according to the first embodiment.

Therefore, during regenerative brake control, motor controller 8 receives the regenerative portion command and, based on the required target regenerative braking, determines a regenerative current value for the electric motor 5 and feed-forward controls the regenerative torque. Brake controller 7 that receives the pump-up pressure command, sets the pump-up pressure as a target difference pressure, and controls VDC motor 21 to increase revolution while determining the operative current to both M/C cutoff solenoid valves 25, 26 for controlling the pressure difference via feed-forward control using a relationship such as shown in FIG. 6.

Figure 10:
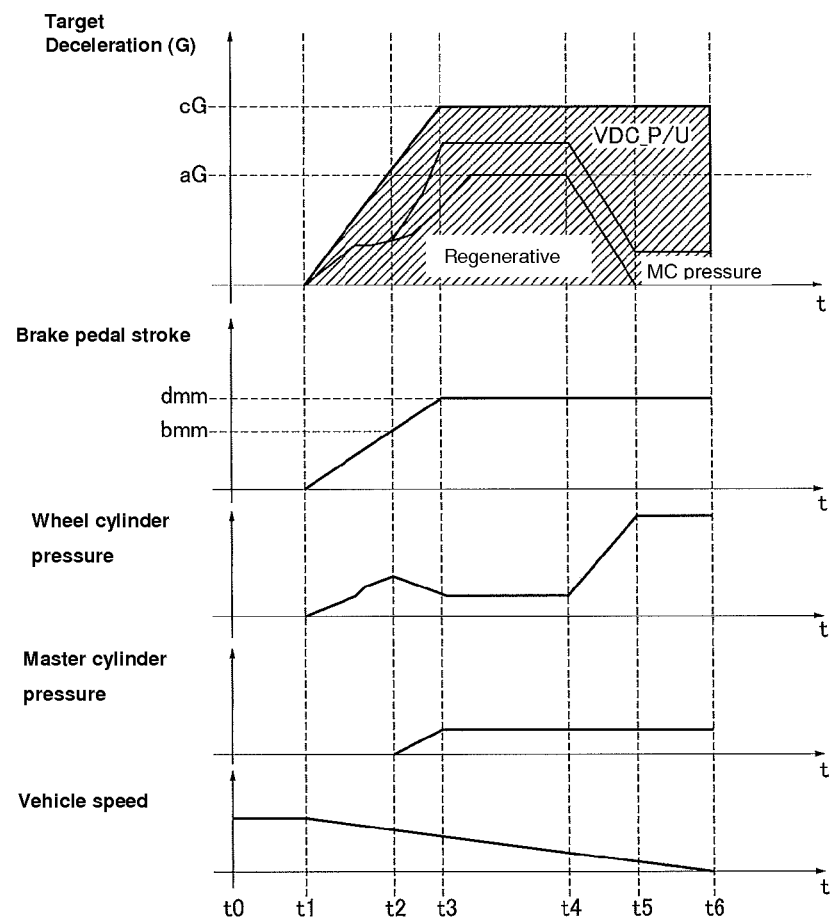
FIG. 10 is a time chart showing an example of the regenerative coordinate brake control operation in which the HEV including the brake control system according to the first embodiment travels at a constant deceleration and comes to stop.

Referring to the time chart illustration in FIG. 10, an example of regenerative coordinate brake control is now described in response to brake application with a constant deceleration for a hybrid vehicle incorporating the brake control device of an embodiment.

From time point t0 to t1, the vehicle maintains a constant vehicle speed, and upon brake pedal operation, the target deceleration amount will increase from zero G (at t1) to aG (at t2). In this region, the target deceleration is obtained by increasing the regenerative portion and the pump-up portion (VDC_P/U), leading to a pressure increase to the wheel cylinder pressure. Since brake pedal 11 is within the region of loss stroke (brake pedal stroke is between 0 mm through b mm), no master cylinder pressure is generated.

At time point t2, the loss stroke operation comes to an end, and generation of master cylinder pressure begins. From this time point t2 through time point t3, target deceleration increases from aG to cG. This target deceleration is achieved by appropriately allocating the base brake fluid pressure portion due to increase of the master cylinder pressure, increasing the regenerative brake portion and decreasing the pump-up pressure portion (VDC_P/U).

When at time point t3 at which the brake pedal stroke is held constant at d mm, the target deceleration is also held constant at cG until a time point t4 at which the regenerative portion is restricted. The target deceleration amount is achieved by a base brake fluid pressure portion from a constant master cylinder pressure, a permissible maximum level of the regenerative portion and a constant pump-up portion, leading to a constant wheel cylinder pressure.

Then, regenerative energy is restricted from this time point t4 up to time point t5. With no regenerative portion, the target deceleration amount is maintained at cG. Here, the target deceleration is achieved by the base brake fluid pressure portion resulting from a constant master cylinder pressure, a decreasing regenerative portion and an increasing pump-up pressure portion (VDC_P/U).

The regenerative portion becomes zero at time point t5. From this time point t5 to time point t6 at which the vehicle stops, the target deceleration level is maintained at constant value cG. The target deceleration is achieved by the base brake fluid pressure portion of the constant master cylinder pressure and the add-on portion due to a constant wheel cylinder pressure. Here, during the region between time point t5 through time point t6, because regenerative braking has ceased, the deceleration will largely depend on the add-on portion (VDC_P/U).

Therefore, due to regenerative coordinate braking control during a braking operation, as shown in FIG. 10, out of the braking energy associated with the braking operation is recovered and stored in the battery.

2) Setting of a Target Deceleration Characteristic Map

As discussed in the technical problem of the comparative example, a change of an actual point of master cylinder pressure generation from the originally designed one is unavoidable due to mechanical tolerances or wear involved in the brake components. To cope with this situation, it is necessary to determine the actual master cylinder pressure generating point, and subsequently prepare a target deceleration characteristic. In the following, an explanation is made on the procedure to set a target deceleration characteristic map reflecting changes in the master cylinder pressure generating points.

Referring back to FIG. 4, as long as brake pedal 11 is not applied, the procedure repeatedly steps through steps S1 and S2. When brake pedal 11 is applied yet no generation of master cylinder pressure occurs, the procedure goes through steps S1, S2 and S3 and returns repeatedly. When brake pedal 11 exceeds the loss stroke region and master cylinder pressure begins to generate, the procedure goes through steps S1, S2, S3, S4 and S5. At step S4, the pedal stroke position at which master cylinder pressure actually generates is stored in memory as the actual master cylinder pressure generating point. At the next step S5, the add-on target deceleration amount is set to be maximized at the actual master cylinder pressure generating point, and a target deceleration characteristic with a gradual change over a range of brake pedal stroke is defined as the target deceleration characteristic map.

In the course of defining the target deceleration characteristic map, a brake pedal stroke is first sensed to confirm the point at which a master cylinder pressure actually generates. Then, the target deceleration at this confirmed actual point is set to be a maximum of the add-on target braking force to be added to the base brake fluid pressure portion. Since at this point there is no base brake fluid pressure generated, the target deceleration approximately corresponds to the regenerative gap.

As explained in the comparative example, due to manufacturing or assembly tolerances of brake system components, an actual master cylinder pressure generating point will be delayed or advanced, as the case may be. However, regardless of the direction of change of the actual point as compared to the designed master cylinder pressure generating point, the add-on target value for deceleration is set to be a maximum of an add-on target braking force, i.e., the regenerative gap. As will be illustrated in FIGS. 11 and 12, with the regenerative gap as a maximum add-on target braking force, a reference target characteristic profile is shifted toward the actual master cylinder generating points B, C from the designed point A. The target deceleration characteristic changes gradually over brake pedal stroke as shown in solid lines.

Figure 11:
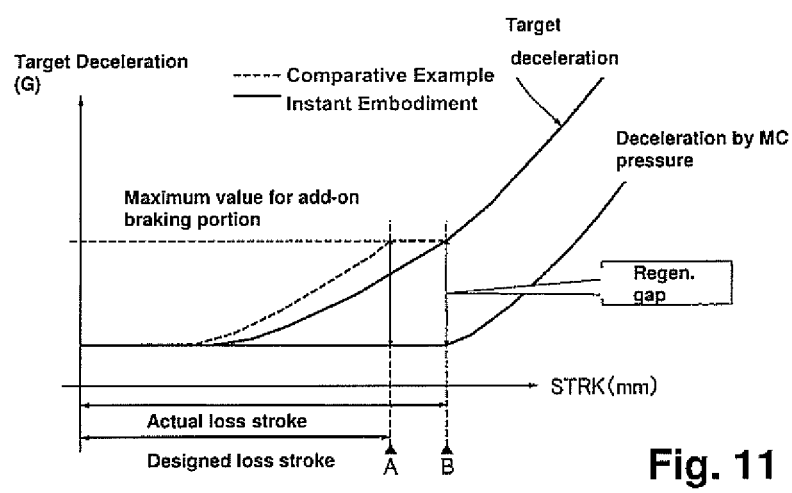
FIG. 11 is a comparative analysis showing technical advantages realized by appropriately setting the target deceleration characteristic map for a brake control system according to the first embodiment when the actual master cylinder loss stroke is greater than designed.

For example, if the actual master cylinder pressure generating point B is a delayed point after the designed point A as shown in FIG. 11, a target deceleration characteristic is set to gradually change over the entire stroke of brake pedal 11. More specifically, from zero stroke to point B, a gradual rising curve to meet the regenerative gap at point B is defined. Thereafter, in accordance with the deceleration characteristic accorded by the master cylinder pressure, the characteristic curve rises while maintaining a constant difference of the regenerative gap. As shown in FIG. 11 with broken lines, the comparative example exhibits a suppression of an increase in braking force despite the progress of brake pedal stroke travel between point A and point B. In contrast and in accordance with the teachings herein, the target deceleration increases gradually during the brake stroke region between point A and B. Thus, a comfortable brake pedal feel is assured without uneven pedal feel.

Figure 12:
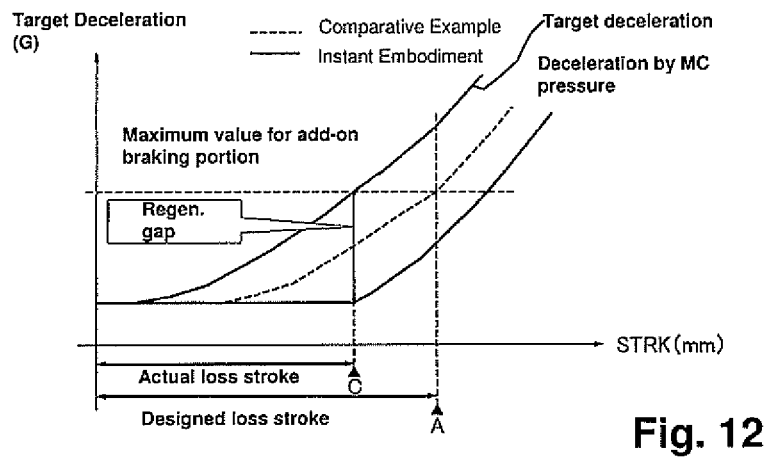
FIG. 12 is another comparative analysis showing technical advantages realized by appropriately setting the target deceleration characteristic map for a brake control system according to the first embodiment when the actual master cylinder loss stroke is smaller than designed.

On the other hand, when the actual master cylinder pressure generating point C is sensed to be earlier than the designed point A, as shown in solid lines in FIG. 12, the braking target characteristic changes gradually over the entire pedal stroke travel range. Specifically, from a zero stroke point to point C, a characteristic curve is set to gradually rise up to the regenerative gap. For the stroke region in excess of point C, the curve rises further in accordance with the progress of the brake pedal stroke while maintaining a constant regenerative portion, i.e., the regenerative gap. In the comparative example shown in FIG. 12, a target deceleration characteristic (broken lines) in which the target deceleration is suppressed over the entire pedal stroke travel exists. In contrast, in the present embodiment, the target deceleration characteristic curve increases for a region before point C and maintains the regenerative gap as an add-on braking force after point C. This assures a high level of energy recovery for improving vehicle efficiency.

As explained above, according to these illustrated embodiments, at the actual master cylinder pressure generating points B and C, the deceleration force corresponding to the regenerative gap is placed on the characteristic profile or curve, and the target deceleration characteristic is defined to take a gradual change over the range of brake pedal stroke travel. Due to this arrangement, change in the actual master cylinder pressure points caused by mechanical tolerances will not influence the target deceleration. Therefore, during the regenerative coordinate brake control operation, setting a target deceleration by excluding the influence of the master cylinder pressure generating point will result in a more comfortable brake operation as well as securing a high level of regenerative energy.

Next, a methodology to set a target deceleration characteristic by an off-set adjustment is now described. First, in reference map setting unit 9a and referring to FIG. 13A, a designed point of brake pedal stroke A is determined, based on the designed loss-stroke, at which master cylinder pressure is estimated to begin to be generated. Then, a reference map containing a reference target deceleration characteristic Ga that assumes a maximum value for an add-on target braking force at the designed point A as the regenerative gap is developed. Subsequently, during deceleration, actual master cylinder pressure generating point B or C of the brake pedal stroke position is detected based on the sensed pedal stroke position and master cylinder pressure sensor at target deceleration characteristic map setting unit 9b.

Figure 13A:
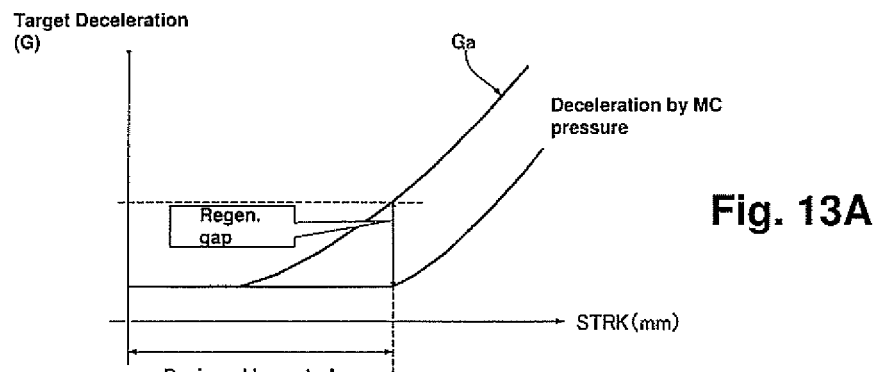
Figure 13B:
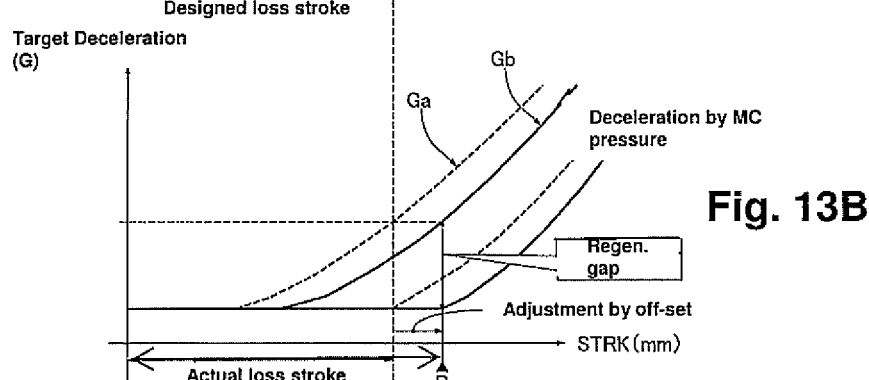

When the detected actual master cylinder pressure generating point B is delayed from designed point A, then as illustrated in FIG. 13B, the add-on braking force is maximized to take the value for the regenerative gap at the detected point B. The reference target deceleration characteristic Ga read from reference map setting unit 9a is shifted or offset in the stroke increasing direction to define an adjusted target deceleration characteristic Gb.

Figure 13C:
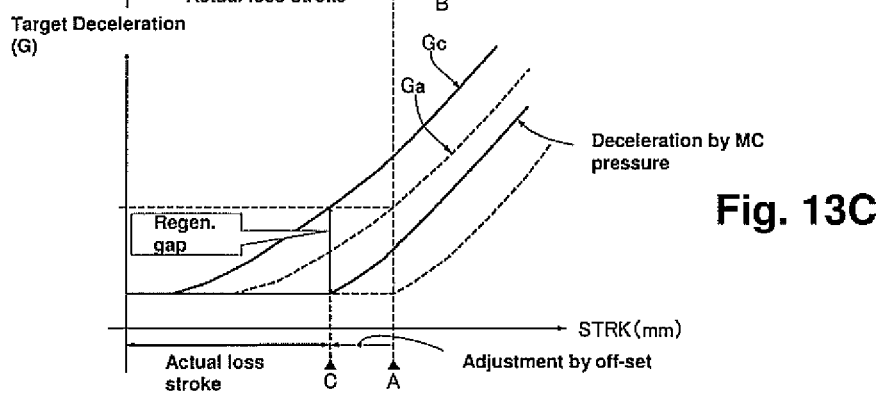

On the other hand, when the detected actual master cylinder pressure generating point C is earlier than designed point A, then as illustrated in FIG. 13C, the add-on braking force is maximized to take the value for the regenerative gap at the detected point C. The reference target deceleration characteristic Ga read from reference map setting unit 9a is shifted or off-set in the stroke decreasing direction to define an adjusted target deceleration characteristic Gc.

As explained above, the reference target deceleration characteristic Ga is previously stored, and subsequently the reference target deceleration characteristic Ga is adjusted by offsetting to define target deceleration characteristic Gb or target deceleration characteristic Gc. By this procedure, once the add-on braking portion has been set to assume the maximum value at the referenced or designed master cylinder pressure generating point, no need exists for defining the characteristic curves passing this maximum value for each and every master cylinder pressure generating points. Therefore, setting of target deceleration characteristic, while excluding the influences by mechanical tolerances, is made with ease.

3) Adjustment of the Target Deceleration Characteristic Map

The possible reasons for the discrepancy of actual master cylinder pressure generating points from that designed may also be due to the difference in depressing speed or velocity of brake pedal 11. In view of more appropriate setting of a target deceleration characteristic, an attempt should be made to eliminate differences in pedal depressing velocity. In the following, explanations are made of the target deceleration characteristic map reflecting the pedal depressing velocity.

When brake pedal 11 is applied, as shown in the flow chart of FIG. 5, the process advances from step S22 through step S23. At step S23, brake pedal depressing velocity is calculated, and adjustment of the target deceleration map in consideration of pedal depressing velocity is performed. This adjustment is made if the pedal velocity related information included in the preset target deceleration characteristic map and the depressing velocity calculated at step 23 are different. Here it should be appreciated that the rationale behind the adjustment by pedal depressing velocity resides in that the timing of the actual master cylinder pressure generating point gets earlier as the pedal depressing velocity gets faster, and the actual master cylinder pressure generating points will move in the shorter direction of brake pedal stroke. Such an off-set distance should be considered in implementing the off-set adjustments of the target deceleration characteristic.

Figure 14:
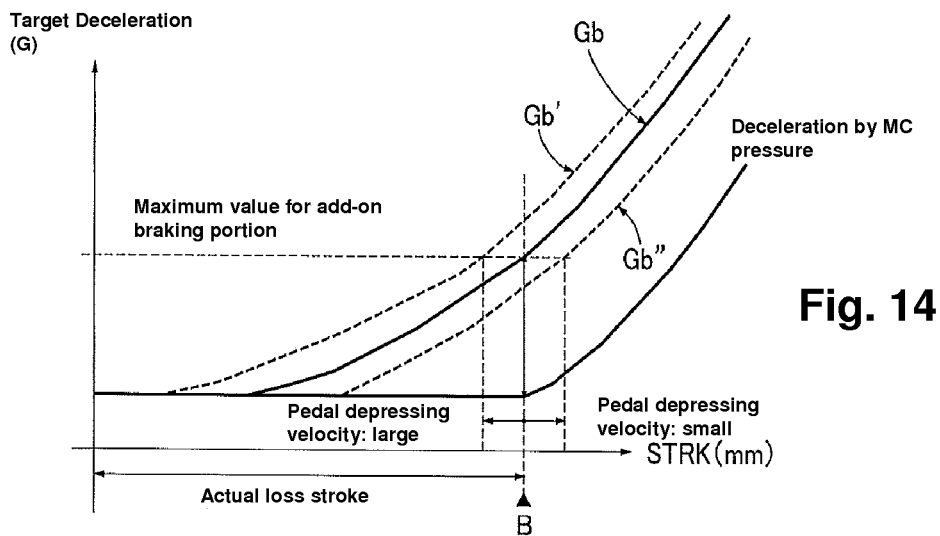
FIG. 14 is a graph of target deceleration as a function of brake pedal stroke in a first example.
Figure 15:
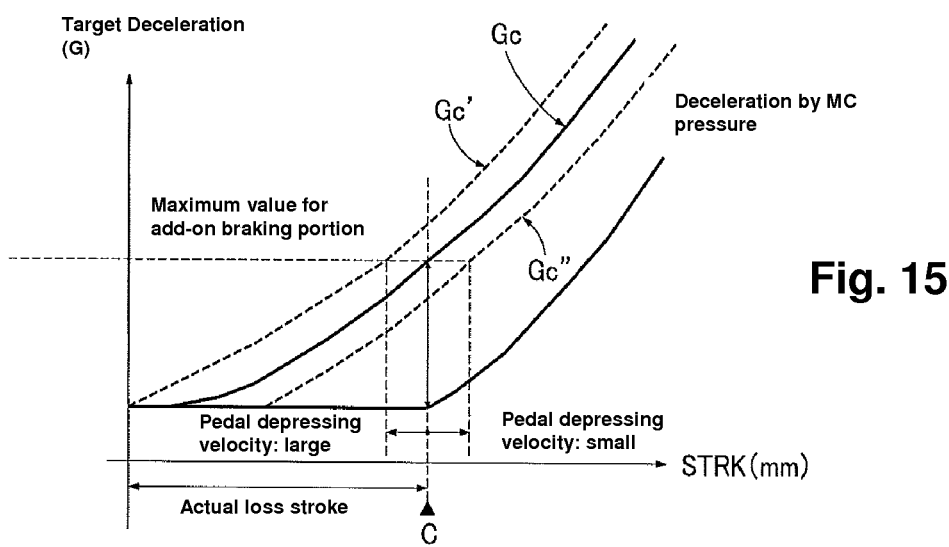
FIG. 15 is a graph of target deceleration as a function of brake pedal stroke in a second example.

For example, referring to FIG. 14, when the target deceleration characteristic Gb has been set at the actual master cylinder pressure generating point B, the adjustment of the target deceleration characteristic map is made reflecting the pedal depressing velocity in the following manner. If the calculated depressing velocity is larger than the presupposed depressing velocity of brake pedal 11 reflected in the target deceleration characteristic Gb, then the loss stroke travel to the actual master cylinder pressure generating point B is set shorter and off-set in the left direction in FIG. 14, and an adjusted target deceleration characteristic Gb' is obtained. Conversely, if the calculated depressing velocity is smaller than the presupposed depressing velocity of brake pedal 11 reflected in the target deceleration characteristic Gb, then the loss stroke travel to the actual master cylinder pressure generating point B is set longer and off-set in the right direction in FIG. 14, and an adjusted target deceleration characteristic Gb" is obtained For example, referring to FIG. 15, when the target deceleration characteristic Gc has been set at the actual master cylinder pressure generating point C, the adjustment of the target deceleration characteristic map is made reflecting the pedal depressing velocity in the following manner. If the calculated depressing velocity is larger than the presupposed depressing velocity of brake pedal 11 reflected in the target deceleration characteristic Gc, then the loss stroke travel to the actual master cylinder pressure generating point C is set shorter and off-set in the left direction in FIG. 15, and an adjusted target deceleration characteristic Gc' is obtained. Conversely, if the calculated depressing velocity is smaller than the presupposed depressing velocity of brake pedal 11 reflected in the target deceleration characteristic Gc, then the loss stroke travel to the actual master cylinder pressure generating point C is set longer and off-set in the right direction in FIG. 15, and an adjusted target deceleration characteristic Gc" is obtained Needless to say, if the presupposed pedal depressing velocity used in a target deceleration characteristic map Gb and/or Gc and the calculated depressing velocity match, or lie within a permissible range, it is not necessary to adjust the target deceleration characteristic maps Gb, Gc.

As explained above, when detecting an actual master cylinder pressure generating point, brake pedal depressing velocity can also be calculated so that the target deceleration characteristic map is set reflecting the actual pedal depressing velocity. During the regenerative coordinate braking control operation, if the presupposed depressing velocity is different from the actual depressing velocity, then the target deceleration characteristic is off-set in such a way that as the depressing velocity increases, the loss stroke is set shorter and the characteristic profile is off-set accordingly. By this arrangement, the target deceleration characteristic map excluding influences of mechanical tolerance may be further modified to eliminate the influence caused by the brake pedal depressing velocity. Therefore, during regenerative coordinate braking, the target deceleration characteristic map excluding influences by mechanical tolerances may be further tailored to eliminate the influences of the pedal depressing speed.

According to the teachings herein, technical advantages are obtained by embodiments of the invention as detailed below.

First, by setting a braking target (target deceleration) during regenerative coordinate braking, comfortable brake pedal feel as well as maximum energy recovery is assured.

Second, the braking target characteristic (target deceleration characteristic Gb, Gc) compensating for changes in master cylinder pressure generating points may be easily obtained by way of off-setting of the reference braking target characteristic (reference target deceleration characteristic Ga).

Third, both the influence from the mechanical tolerances and that of the pedal depressing speed are eliminated during regenerative braking control, and a highly accurate target braking characteristic map (target deceleration characteristic map) is obtained.

In the above, the brake control system of an electrically driven vehicle according to the present invention is described mainly based on a first embodiment. However, specific configurations or constituents are not limited to those disclosed in the first embodiment. Rather one versed in the art would appreciate that there are other embodiments and modifications within the scope of the present invention. Accordingly, all modifications attainable by one versed in the art from the present disclosure within the scope of the present invention are to be included as further embodiments of the present invention.

For example, as described herein, a target deceleration map against brake pedal stroke is shown as the braking target characteristic map. However, other alternatives may be employed such as a target braking force or torque map against the driver brake pedal stroke, driver demand deceleration map against brake pedal stroke or demand brake force map against brake pedal stroke. Moreover, instead of referencing a map, a target deceleration characteristic may be calculated on a real time basis. In sum, during brake pedal operation, as long as the braking target characteristic is obtained reflecting a driver braking performance demand, use of a map containing a characteristic curve is not required, but a characteristic value may be calculated or modified based on the characteristic equations reflected in the characteristic map.

Moreover, the deceleration characteristic has been defined herein in such a way that the target deceleration at the detected, actual master cylinder generating point assumes a maximum of the add-on braking portion (i.e., the regenerative gap), and the target deceleration characteristic varies gradually over the change in brake pedal stroke. However, it is also feasible that the difference between the target deceleration value at the actual point and the maximum value for add-on braking (regenerative gap) may be within a tolerable range.

In embodiments described herein, the target deceleration characteristic map is set by an off-set adjustment of the reference target deceleration characteristic map. However, without relying on the off-setting methodology, the inclination angle of the reference target deceleration characteristic curve may be changed to set the target deceleration characteristic. Also, without setting a reference target deceleration characteristic map, the target deceleration may be calculated to assume a maximum add-on portion (regenerative gap) at the detected actual master cylinder pressure generating point.

More specifically, the target deceleration characteristic G according to FIGS. 13A to 13C may be calculated by the following equation without relying on a map:

$$\text{target } G = a + b(x - \text{delta } S) + c(x - \text{delta } S)(x - \text{delta } S); \quad (5)$$

wherein delta S=actual loss stroke−designed loss stroke; and a, b and c are predetermined coefficients.

According to embodiments of the present invention, the target deceleration may be set at the actual master cylinder pressure generating point or timing to assume the maximum value for an add-on braking, preferably by way of regenerative braking irrespective of use of map or real time calculation. In addition, the actual master cylinder pressure generating point may be adjusted by learning control based on the various data obtained through brake control experiences. The target deceleration map may be set or tuned either at the off-line testing or setting station after brake control components have been installed on vehicle in the car assembly line or at a dealership, or at the first brake operation timing each time an ignition or start switch has been turned on by a driver.

In one embodiment, a map adjustment methodology is explained to compensate for brake pedal depressing velocity. The target deceleration characteristic map containing a presupposed, reference brake depressing velocity at the master cylinder pressure generating point is adjusted by off-setting in accordance with the detected depressing velocity. If memory capacity in the target deceleration characteristic map setting unit would not pose a problem, a plurality of target deceleration characteristics may be prepared against a plurality of brake depressing speeds so that, depending on the actual braking speed detected, the best map out of the plurality of target deceleration characteristic maps may be read and applied.

According to the embodiments described herein, VDC brake fluid unit 2 as shown in FIG. 2 is utilized as a brake fluid actuator. For the brake fluid pressure actuator, it is sufficient to provide a fluid pressure pump driven by VDC motor and a differential pressure valve for controlling the pressure difference between the wheel cylinder pressure and master cylinder pressure during operation of the pump motor. The entirety of unit 2 shown in FIG. 2 is not required.

In the embodiments, the brake control system is applied to a HEV with front wheel drive. However, the present invention may also be applicable to a HEV with rear wheel drive, an electric vehicle, a fuel cell vehicle and other electrically driven vehicles.

Accordingly, while the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A brake control system for an electrically driven vehicle, comprising:
a master cylinder for generating a master cylinder pressure in response to an operation of a brake pedal by a driver;
a wheel cylinder at a driving wheel for applying a brake force in accordance with a wheel cylinder pressure;
a brake fluid actuator having a fluid pressure pump disposed between the master cylinder and the wheel cylinder and driven by a motor;
a differential pressure valve for controlling a pressure difference between the wheel cylinder pressure and the master cylinder pressure during operation of the motor;
an electric motor connected to the driving wheel for controlling a regenerative braking force; and
a brake controller programmed to:
obtain a brake target force for the brake force based on the brake pedal stroke position and a target deceleration characteristic;
achieve the brake target force by summing a base brake pressure portion derived from the master cylinder pressure and an add-on brake portion derived from at least one of a regenerative brake portion due to the regenerative braking force or a pump-up pressure portion from the brake fluid actuator; and
set the add-on portion to a maximum value at an adjusted brake pedal stroke position at a point at which the master cylinder first begins to actually generate the master cylinder pressure.

2. The brake control system as claimed in claim 1, wherein the target deceleration characteristic defines a non-linear relationship between the brake target force and the brake pedal stroke position.

3. The brake control system as claimed in claim 1, wherein the add-on portion is set to substantially match a regenerative gap available at the adjusted brake pedal stroke position at which the master cylinder first begins to actually generate the master cylinder pressure.

4. The brake control system as claimed in claim 1, wherein the brake controller is programmed to:
define a designed master cylinder pressure generating point at which an unadjusted brake pedal stroke position reaches a designed loss stroke of the brake pedal;
set the brake target force as a maximum add-on brake portion at the designed master cylinder pressure generating point; and
prepare a reference brake target characteristic that changes gradually over the unadjusted pedal stroke position with respect to the brake target force;
detect an actual master cylinder pressure generating point corresponding to an actual loss stroke of the brake pedal, the actual loss stroke being the adjusted brake pedal stroke position;
detect a difference in position between the actual master cylinder pressure generating point and the designed master cylinder pressure generating point; and
create the target deceleration characteristic by offsetting the reference brake target characteristic in a direction of the actual master cylinder pressure generating point.

5. The brake control system as claimed in claim 1, wherein the brake controller is programmed to detect a depressing velocity of the brake pedal at the point at which the master cylinder first begins to actually generate the master cylinder pressure and to adjust the target deceleration characteristic in accordance with the depressing velocity as detected.

6. The brake control system as claimed in claim 1, further comprising:
a master cylinder pressure sensor to generate a master cylinder indicative signal; and
a brake pedal stroke sensor to generate a brake pedal stroke position indicative signal; and wherein the brake controller is programmed to determine the adjusted brake pedal stroke position at which the master cylinder first begins to actually generate the master cylinder pressure using the master cylinder indicative signal and the brake pedal stroke position indicative signal.

7. A brake control system for an electrically driven vehicle, comprising:

means for obtaining a brake target force for a brake force to be applied to a wheel cylinder at a driving wheel based on a brake pedal stroke position of a brake pedal and a target deceleration characteristic using a brake controller;

means for achieving the brake target force by summing a base brake pressure portion derived from a master cylinder pressure generated by a master cylinder in response to an operation of the brake pedal by a driver and an add-on brake portion derived from at least one of a regenerative brake portion due to a regenerative braking force controlled by an electric motor connected to the driving wheel or a pump-up pressure portion from a brake fluid actuator having a fluid pressure pump disposed between the master cylinder and the wheel cylinder and driven by a motor a differential pressure valve controlling a pressure difference between the wheel cylinder pressure and the master cylinder pressure during operation of the motor; and means for setting the add-on portion to a maximum value at an adjusted brake pedal stroke position at a point at which the master cylinder first begins to actually generate the master cylinder pressure.

8. A brake control system for an electrically driven vehicle, comprising:

obtaining a brake target force for a brake force to be applied to a wheel cylinder at a driving wheel based on a brake pedal stroke position of a brake pedal and a target deceleration characteristic using a brake controller;

achieving the brake target force by summing a base brake pressure portion derived from a master cylinder pressure generated by a master cylinder in response to an operation of the brake pedal by a driver and an add-on brake portion derived from at least one of a regenerative brake portion due to a regenerative braking force controlled by an electric motor connected to the driving wheel or a pump-up pressure portion from a brake fluid actuator having a fluid pressure pump disposed between the master cylinder and the wheel cylinder and driven by a motor, a differential pressure valve controlling a pressure difference between the wheel cylinder pressure and the master cylinder pressure during operation of the motor; and setting the add-on portion to a maximum value at an adjusted brake pedal stroke position at a point at which the master cylinder first begins to actually generate the master cylinder pressure.

9. The brake control system as claimed in claim 8, wherein the target deceleration characteristic defines a non-linear relationship between the brake target force and the brake pedal stroke position.

10. The brake control system as claimed in claim 8, wherein setting the add-on portion further comprises:

setting the add-on portion to substantially match a regenerative gap available at the adjusted brake pedal stroke position at which the master cylinder first begins to generate the master cylinder pressure.

11. The brake control system as claimed in claim 8, further comprising:

defining a designed master cylinder pressure generating point at which an unadjusted brake pedal stroke position reaches a designed loss stroke of the brake pedal;

setting the brake target force as a maximum add-on brake portion at the designed master cylinder pressure generating point; and preparing a reference brake target characteristic that changes gradually over the unadjusted pedal stroke position with respect to the brake target force;

detecting a difference in position between an actual master cylinder pressure generating point and the designed master cylinder pressure generating point, the actual master cylinder pressure generating point corresponding to the adjusted brake pedal stroke position; and creating the target deceleration characteristic by offsetting the reference brake target characteristic in a direction of the actual master cylinder pressure generating point.

12. The brake control system as claimed in claim 11, further comprising:

detecting a depressing velocity of the brake pedal at the point at which the master cylinder first begins to actually generate the master cylinder pressure; and adjusting the target deceleration characteristic in accordance with the depressing velocity as detected.

13. The brake control system as claimed in claim 8, further comprising:

generating a master cylinder pressure signal using a pressure sensor; and generating a brake pedal stroke position signal using a brake pedal stroke sensor; and determining the point at which the master cylinder first begins to actually generate the master cylinder pressure using the master cylinder pressure signal and the brake pedal stroke position signal.

\* \* \* \* \*